US008699566B2

(12) United States Patent
Ananthanarayanan et al.

(10) Patent No.: US 8,699,566 B2
(45) Date of Patent: Apr. 15, 2014

(54) ADAPTIVE AND INTEGRATED VISUALIZATION OF SPATIOTEMPORAL DATA FROM LARGE-SCALE SIMULATIONS

(75) Inventors: Rajagopal Ananthanarayanan, San Jose, CA (US); Shyamal S. Chandra, San Jose, CA (US); Dharmendra S. Modha, San Jose, CA (US); Raghavendra Singh, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 12/695,119

(22) Filed: Jan. 27, 2010

(65) Prior Publication Data

US 2011/0182349 A1     Jul. 28, 2011

(51) Int. Cl.
*G06F 15/00*     (2006.01)

(52) U.S. Cl.
USPC ........ 375/240.01; 434/336; 434/262; 706/20; 706/44

(58) Field of Classification Search
None
See application file for complete search history.

(56) References Cited

U.S. PATENT DOCUMENTS

| | | | |
|---|---|---|---|
| 5,313,558 A | 5/1994 | Adams | |
| 5,333,299 A | 7/1994 | Koval et al. | |
| 5,784,067 A | 7/1998 | Ryll et al. | |
| 6,173,317 B1 | 1/2001 | Chaddha et al. | |
| 6,360,022 B1 | 3/2002 | Lubin et al. | |
| 6,400,850 B1 | 6/2002 | Nonomura | |
| 7,239,311 B2 | 7/2007 | Dunn et al. | |
| 7,413,546 B2 | 8/2008 | Agutter et al. | |
| 7,580,907 B1* | 8/2009 | Rhodes | 706/20 |
| 2005/0187589 A1* | 8/2005 | Wallace et al. | 607/45 |
| 2007/0195345 A1* | 8/2007 | Martinez et al. | 358/1.9 |
| 2008/0145830 A1* | 6/2008 | Huang et al. | 434/336 |
| 2010/0049482 A1* | 2/2010 | He et al. | 703/2 |

FOREIGN PATENT DOCUMENTS

WO     WO 2008/064352 A2     5/2008

OTHER PUBLICATIONS

Lobb et al. (Parallel Event-Driven Neural Network Simulations Using the Hodgkin-Huxley Neuron Model), 2005.*
R. Ohbuchi et al., "Integrated medical-image system for cancer research and treatment," IBM I. Res. Develop. Mar. 1996,pp. 185-210, vol. 40, No. 2, United States.
E. M. Izhikevich et al., "Spike-timing Dynamics of Neuronal Groups," Cerebral Cortex, Aug. 2004, pp. 933-944, V 14., N 8., Oxford University Press, United States.

(Continued)

*Primary Examiner* — Christopher S Kelley
*Assistant Examiner* — Mohammed Jebari
(74) *Attorney, Agent, or Firm* — Kenneth L. Sherman, Esq.; Michael Zarrabian, Esq.; Sherman & Zarrabian LLP

(57) ABSTRACT

Adaptive and integrated visualization of spatiotemporal data from large-scale simulation, is provided. A simulation is performed utilizing a simulator comprising multiple processors, generating spatiotemporal data samples from the simulation. Each data sample has spatial coordinates with a time stamp at a specific time resolution, and a tag. The data samples are assembled into data streams based on at least one of a spatial relationship and the corresponding tag. Each data stream is encoded into multiple formats, and an integrated and adaptive visualization of the data streams is displayed, wherein various data streams are simultaneously and synchronously displayed.

16 Claims, 15 Drawing Sheets

(56) References Cited

OTHER PUBLICATIONS

E. M. Izhikevich et al., "Large-scale model of mammalian thalamocortical systems," PNAS, Mar. 4, 2008, pp. 3593-3598, vol. 105, No. 9., downloaded at: www.pnas.org/cgi/doi/doi/10.1073/pnas.0712231105, The National Academy of Sciences, United States.

D. Keim, "Pixel-oriented Visualization Techniques for Exploring Very Large Databases," Journal of Computational and Graphical Statistics, Mar. 1996, pp. 1-23 (58-77), vol. 5, No. 1, United States.

D. Keim, "Designing Pixel-Oriented Visualization Techniques: Theory and Applications," IEEE Transactions on Visualization and Computer Graphics, Jan.-Mar. 2000, pp. 1-20, vol. 6, No. 1., IEEE Educational Activities Department Piscataway, NJ, USA.

R. Ananthanarayanan et al., "Anatomy of a Cortical Simulator," Proceedings of the ACM/IEEE SC2007 Conference on High Performance Networking and Computing, Nov. 2007, pp. 1-12, ACM, United States.

K. L. Gong et al., "Parallel MPEG-1 Video Encoding," PCS, Sep. 1994, pp. 1-28, downloaded at: http://bmrc.berkeley.edu/research/publications/1994/120/msreport-fm.html, Berkeley Multimedia Research Center, United States.

* cited by examiner

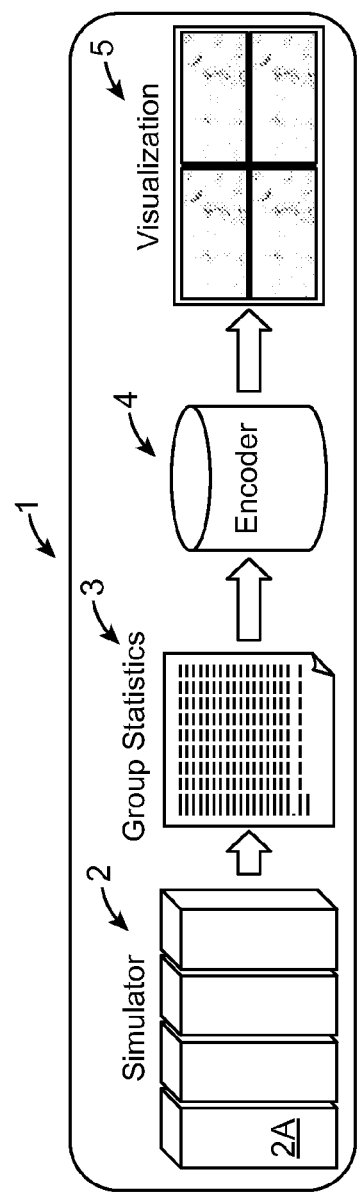
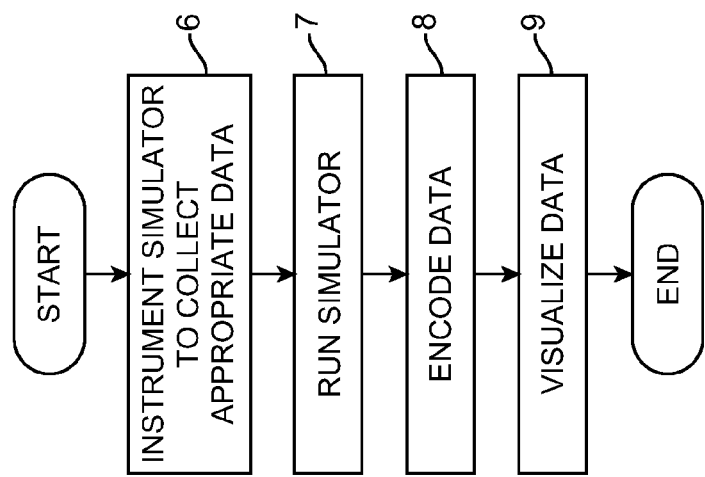

| Red | Green | Blue | |
|---|---|---|---|
| 0 | 0 | 143 | Blue 1 |
| 0 | 0 | 159 | Blue 2 |
| 0 | 0 | 175 | Blue 3 |
| ... | | | |
| 175 | 0 | 0 | Red 1 |
| 159 | 0 | 0 | Red 2 |
| 143 | 0 | 0 | Red 3 |

} 64 color map

| Firing Rate | Red | Green | Blue | |
|---|---|---|---|---|
| 0 | 0 | 0 | 143 | Dark blue |
| 1 | 0 | 32 | 255 | Light blue |
| 2 | 0 | 191 | 255 | Dark green |
| 3 | 96 | 255 | 175 | Light green |
| 4 | 255 | 255 | 16 | Yellow |
| 5 | 255 | 112 | 0 | Orange |
| 6 | 207 | 0 | 0 | Red |

} Color Map for a range of 6

FIG. 4

*tstats*

```
# Steps 1000 Neurons 344064 Synapses 5680087578
# nfired  n_i_fired    AvgVex      AvgUex    AvgVin
       0          0   -67.7873   -13.0000   -67.8050
       0          0   -69.6299   -13.0111   -69.6813
       0          0   -70.3388   -13.0294   -70.6435
     256          0   -71.1211   -13.0448   -71.0219
       0          0   -71.2290   -13.0683   -71.0480
       0          0   -70.8507   -13.0919   -70.6314
     153          0   -70.1192   -13.1097   -69.9886
     249         20   -69.5278   -13.1235   -68.8993
    1095        175   -68.0672   -13.1185   -67.0516
    2157        357   -64.7939   -13.0904   -63.1609
    7130       1215   -32.2640   -12.9528   -26.3468
   27002       4134    -9.5411   -12.3884    -2.1860
   36059       5274   431.1232   -11.6612   553.8765
     ...        ...       ...       ...        ...
```

FIG. 6

ADAPTIVE AND INTEGRATED VISUALIZATION OF SPATIOTEMPORAL DATA FROM LARGE-SCALE SIMULATIONS

BACKGROUND

1. Field of the Invention

The present invention relates generally to data visualization. In particular, the present invention relates to spatiotemporal simulation data driven visualization.

2. Background

In information technology systems comprising computing systems, simulation typically provides insights into computation principles. In one application, simulation of large networks of cortical spiking neurons provides unique insights into the high-level computational principles of the brain. This allows probing the simulated brain at a very high spatiotemporal resolution, wherein the parameters of the simulation and environment can be modified. However, such a simulation generates large volumes of data, requiring mining of the data to find useful information.

BRIEF SUMMARY

Adaptive and integrated visualization of spatiotemporal data from large-scale simulations, is provided. In one embodiment, a simulation is performed utilizing a simulator comprising multiple processors, generating spatiotemporal data samples from the simulation. Each data sample has spatial coordinates with a time stamp at a specific time resolution, and a tag. The data samples are assembled into data streams based on at least one of a spatial relationship and the corresponding tag. Each data stream is encoded into multiple formats, and an integrated and adaptive visualization of the data streams is displayed, wherein various data streams are simultaneously and synchronously displayed.

In another embodiment, a computer program product for presenting data from a simulation on a display screen is provided. The computer program product comprises computer usable program code configured to render data from a simulation on a display screen by performing a simulation utilizing a simulator comprising multiple processors, and generating spatiotemporal data samples from the simulation. Each data sample has spatial coordinates with a time stamp and a specific time resolution. The computer program code is further configured to assemble the data samples into data streams based on a least one of: a spatial relationship and tags associated with data samples. The computer program code is further configured to encode each data stream into multiple formats, and displays an integrated and adaptive visualization of the data streams, wherein various data streams are simultaneously and synchronously displayed.

In another embodiment, a system for presenting data from a simulation on a display screen, is provided. The system comprises a simulator comprising multiple processors configured for performing a simulation and generating spatiotemporal data samples from the simulation. Each data sample has spatial coordinates with a time stamp and a specific time resolution. The system further comprises an encoder configured for assembling the data samples into data streams based on a spatial relationship, and encoding each data stream into multiple formats. The system further comprises a visualizer configured for displaying an integrated and adaptive visualization of the data streams, wherein various data streams are simultaneously and synchronously displayed.

BRIEF DESCRIPTION OF THE SEVERAL VIEWS OF THE DRAWINGS

FIG. 1A shows a block diagram of a system implementing adaptive, integrated process, for visualization of spatiotemporal data from large-scale simulations;

FIG. 1B shows a flowchart of an embodiment of an overall adaptive, integrated process, for visualization of spatiotemporal data from large-scale simulations;

FIG. 4 shows an example color mapping for visualization of spatiotemporal data;

FIG. 6 shows an example statistics file for spatiotemporal data;

DETAILED DESCRIPTION

Figure 2:
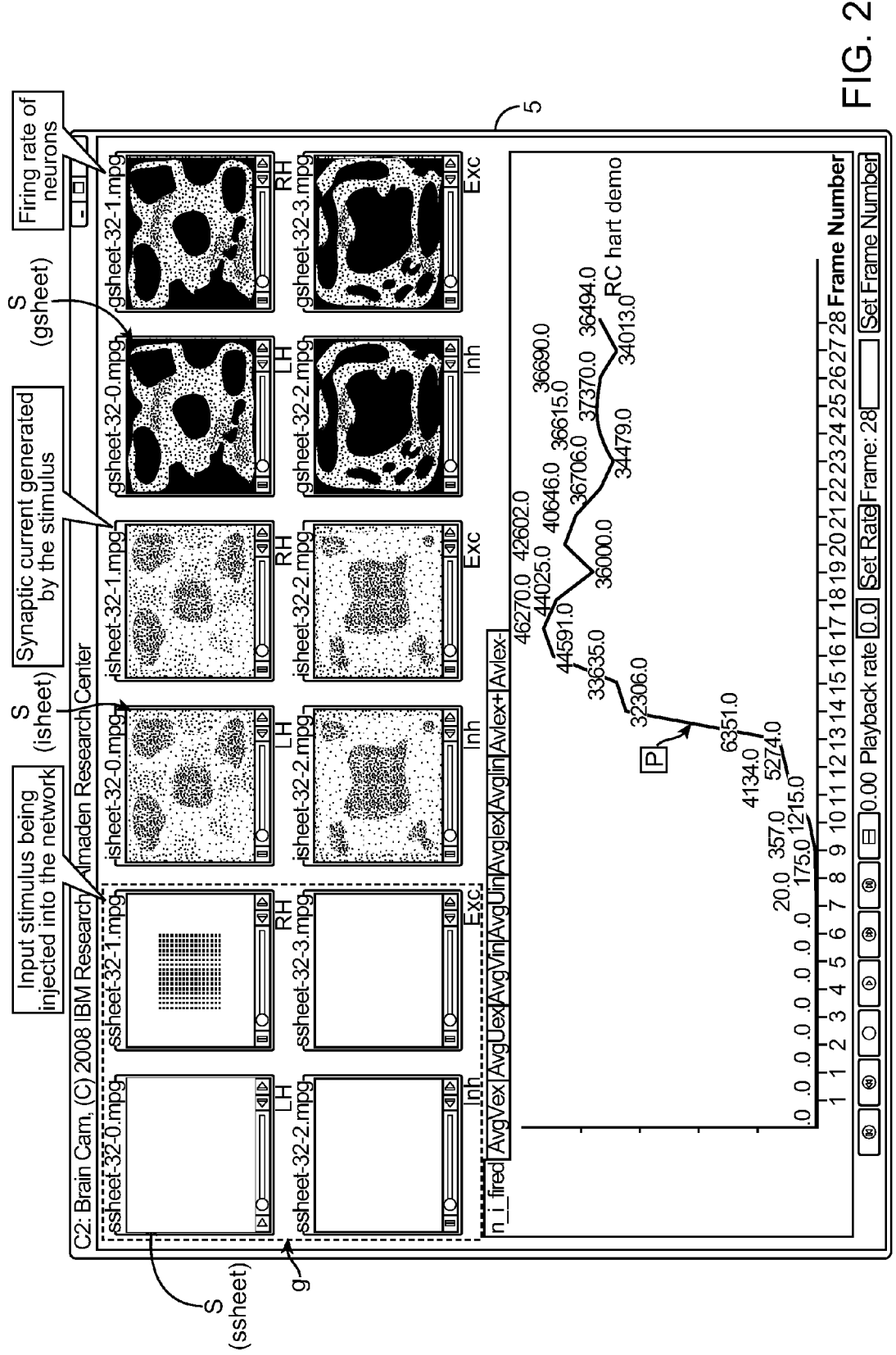
FIG. 2 shows an example two-dimensional color-mapped visualization of spatiotemporal data from a large-scale simulation.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc. The description may disclose several preferred embodiments for visualization of spatiotemporal data from a large-scale simulation in information technology environments. While the following description will be described in terms of such languages for clarity and placing the invention in context, it should be kept in mind that the teachings herein may have broad application to all types of systems, devices and applications.

Adaptive and integrated visualization of spatiotemporal data from large-scale simulation in information technology environments is provided. One embodiment comprises adaptive, integrated visualization of spatiotemporal data from large-scale cortical simulations. Appropriate instrumentation is added to the simulations to extract data that captures the key properties of the simulation dynamics. Data from different computing nodes or processors is collated and merged, and the voluminous state of the simulation is graphically rendered to enable efficient analysis by human end-users.

FIG. 1A shows a functional block diagram of architecture of a computing 1 for implementation of an adaptive, integrated process, for visualization of spatiotemporal data from large-scale simulations. The system 1 comprises a simulator 2 including multiple processors 2A for running a simulation and generating simulation statistics 3, an encoder 4 and a visualizer 5.

FIG. 1B shows processing blocks for a large-scale simulation running in a distributed manner producing large amounts of spatiotemporal data. This involves instrumenting the simulator 2 (block 6) and running the simulator for generating and collecting appropriate simulation data and storing data samples 3 (block 7), wherein the simulator 2 sets time parameters, tags each data sample with an identifier, and distributes the simulation workload over processors. Then, employing the encoder 4 for reading said data samples stored by the processors, wherein the encoder is configured to assemble said data samples 3 into data streams based on a spatial relationship, such that the encoder further encodes each said data stream into different formats (block 8). Then, displaying an integrated and adaptive view of the data streams using the visualizer 5, wherein multiple formats can be played back synchronously (block 9). Tags are associated with a data sample, much like spatial coordinates, and time. The tags can be used for encoding into various formats. Synchronous playback between different data-streams is also provided.

In general, the visualization process disclosed herein can also be applied to any scientific or engineering domain which employs a large-scale, distributed simulation that produces a large amount of spatiotemporal data.

As defined herein, spatiotemporal implies that each data sample produced by the simulator has spatial coordinates with a time stamp at a specific time resolution (e.g., one data point per one millisecond simulation time). The spatial relationships are defined over a k-dimensional grid. The disclosed visualization process herein collects and renders a visualization of such data.

In one embodiment of the system 1, the simulator 2 comprises a cortical simulator, and the visualizer 5 (termed "dashboard" herein) comprises an interface such as a graphical user interface (GUI) for presenting information to the end-user. The present invention comprises a visualization of simulation results, representing an integrated view that simultaneously and synchronously displays various data streams. The data streams can be displayed in various formats, such as time-series plots or videos. The dashboard 5 is adaptive in that the data streams being displayed can be changed at run-time. Thus, the user can tailor the visualization according to the simulation experiment.

The cortical simulator may process many millions of neurons and billions of synapses. In one example, fifty-five million neurons and four hundred forty-two billion synapses have been simulated on a 32,768-processor Blue Gene supercomputer. These neurons are assumed to be distributed on a two dimensional (2D) grid, mimicking the cortical "sheet" in the biological brain. Further, the cortical sheet may be divided into left and right hemispheres, and these may be further divided into inhibitory and excitatory populations. Hence in this case there are effectively 4 sheets.

The data of interest from the simulation includes the current state of each neuron (i.e., whether it has fired or not, the membrane potential of each neuron, the synaptic current, etc.). The data can be collected for each neuron or for a group of spatially neighboring neurons (e.g., adjacent neurons or those in a window around said neuron). In the latter case, the data samples would be statistics over the group of neurons (e.g., number of neurons in the group that fired at a particular time instance). Grouping is a technique for varying the spatial resolution, wherein the number of neurons in a group can be changed in an instrumentation step. The spatial relationship that exists between the neurons is transformed into spatial relationships between groups.

FIG. 2 shows an example simulation of a network of 64×64 groups of excitatory and inhibitory neurons. Three sets of data samples (i.e., input stimulus, synaptic current, and number of neurons firing in a group), are being visualized. There are 4 video streams for each data set: LH=left hemisphere, RH=right hemisphere, Inh=Inhibitory, Exc=Excitatory. The left hemisphere of an excitatory sheet is being supplied a 16×16, uniform grid input stimulus. The plot P shows the firing statistics, the total number of neurons firing at time t, of the inhibitory population.

Selecting the Instrumentation in the Simulator

In one example, instrumentation involves configuring an input file (e.g., with an .in suffix, csim.in) for the simulator 2. This file may comprise a plain text file with the following example format (only the subset pertinent to the instrumentation):

```
OPTIONS gstats yes
OPTIONS sstats yes
OPTIONS istats yes
OPTIONS subtract-currents yes
OPTIONS subtract-currents-time yes
OPTIONS spike-stream aesl.tagged
OPTIONS spike-stream-map input.map
OPTIONS spike-stream-pause 50
OPTIONS spike-stream-repeat no
OPTIONS simplesynapses yes
PARAMS nticks 10000
PARAMS synweight 0.50
PARAMS stimprob 0.005
PARAMS stimval 20.0
MODEL Model-mouse_45_M3_S100_1_125nn.db
RUN
```

In the above csim.in example, the first three options specify whether the different aggregate data samples will be generated at the conclusion of that particular run cycle. The option gstats represents the total number of neurons fired for each spatially-relevant set of neurons (this number is a discrete count). The option sstats represents the statistics of the stimulus presented as input to the simulator. Finally, the option istats represents the synaptic current of spatially-relevant neurons, comparable to BOLD signal used to capture a functional Magnetic Resonance Imaging (fMRI) of the brain.

The second batch of option specifications articulate whether a special operation called subtraction is conducted over time and/or space during the simulation run. The third batch of option specifications describe the input file (e.g. aesl.tagged) and its one-to-one mapping onto the X-Y sheet (e.g., input.map). The fourth batch of option specifications detail the pause between application of the spike stream (e.g., 50 time-steps or milliseconds) and whether the stream is repeated indefinitely. The final option specification for this example defines the properties of the synapses and whether they are simple or complex.

Following the option specifications, the parameters list the number of steps, the starting synaptic weight, the probability of the stimulus being given every time step, and the potency of the stimulus (e.g., 20) during an application on the cortical sheet. Finally, the model filename is given and the run command shows that with the following options and parameters, the simulation should be run. This information is provided for clarity of presentation, and does not limit the invention.

There are two preferred formats in which the data values are rendered (visualized) for display on the dashboard 5. The first is a video stream, and the second is a time-series plot, described below.

Video Display

The simulator 2 (FIG. 1A) includes logic that executes on multiple processors 2A such that each processor simulates one or more groups of neurons. The assignment of groups amongst the processors 2A is performed using an algorithm such as a round-robin algorithm that assigns each group in order of increasing group number to increasingly larger numbered processors, wrapping around if necessary to accommodate any additional groups that are yet to be assigned. As another example, the group assignment may also be performed so as to balance computation load, communication and memory required to simulate the various groups. Even spatially close groups may be simulated on a different processor.

Figure 3:
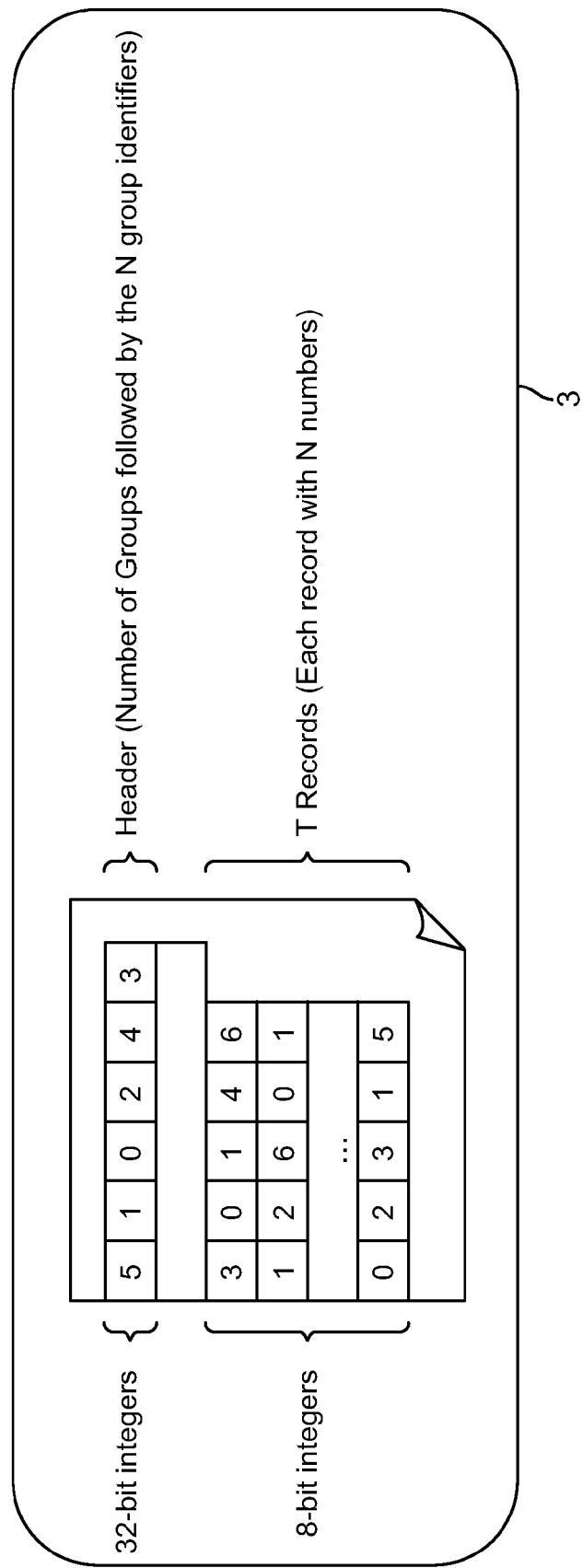
FIG. 3 shows an example simulation output data file.

Regardless of the group assignment, each processor 2A outputs a file 3 of the statistics of all the groups of neurons that it is simulating, as shown by example in FIG. 3. At the beginning of each group statistics file 3, a header record comprises the number of groups G, and G group identifiers, where each number may be represented as a 32-bit unsigned integer. The group identifiers uniquely identify the groups that are being simulated on the corresponding processor. FIG. 3 shows the format of the header and data (T records) when stored.

For explanation purposes, let X and Y represent the dimensions of each sheet (FIG. 2). In the preferred embodiment, the group identifiers are ordered such that the grid number, gridNum, is "0" for inhibitory left hemisphere, "1" for excitatory right hemisphere, "2" for inhibitory right hemisphere and "3" for excitatory left hemisphere. The gridNum can be obtained from the group identifier by the following computations:

$$gridNum = \left\lfloor \frac{identifer}{X*Y} \right\rfloor. \quad (1)$$

Moreover, the ith and jth grid position of the group in the corresponding sheet can be obtained by:

$$j = \left\lfloor \frac{identifier\ \%(X*Y)}{X} \right\rfloor \quad (2)$$

$$i = \left\lfloor \frac{identifier\ \%(X*Y)}{X} \right\rfloor \% X. \quad (3)$$

Furthermore, in the group statistics file, for each timestep, the actual data sample values (e.g., the number of neurons fired) for each group are recorded in the same order as given by the header record. This is an example of implicit tagging where the tag is the identifier that can be resolved using the above relations (1)-(3), to segregate the data samples into the data streams corresponding to different sheets.

The encoder uses a reverse index to map the location of data in a statistic file to a location in a display grid of a sheet. The reverse index is calculated from the relationships (1)-(3) above, once at the start of the video encoding process. This increases the efficiency of the computations used in encoding of each frame of the video. In turn, the total time taken to encode the video stream is greatly reduced.

Figure 5:
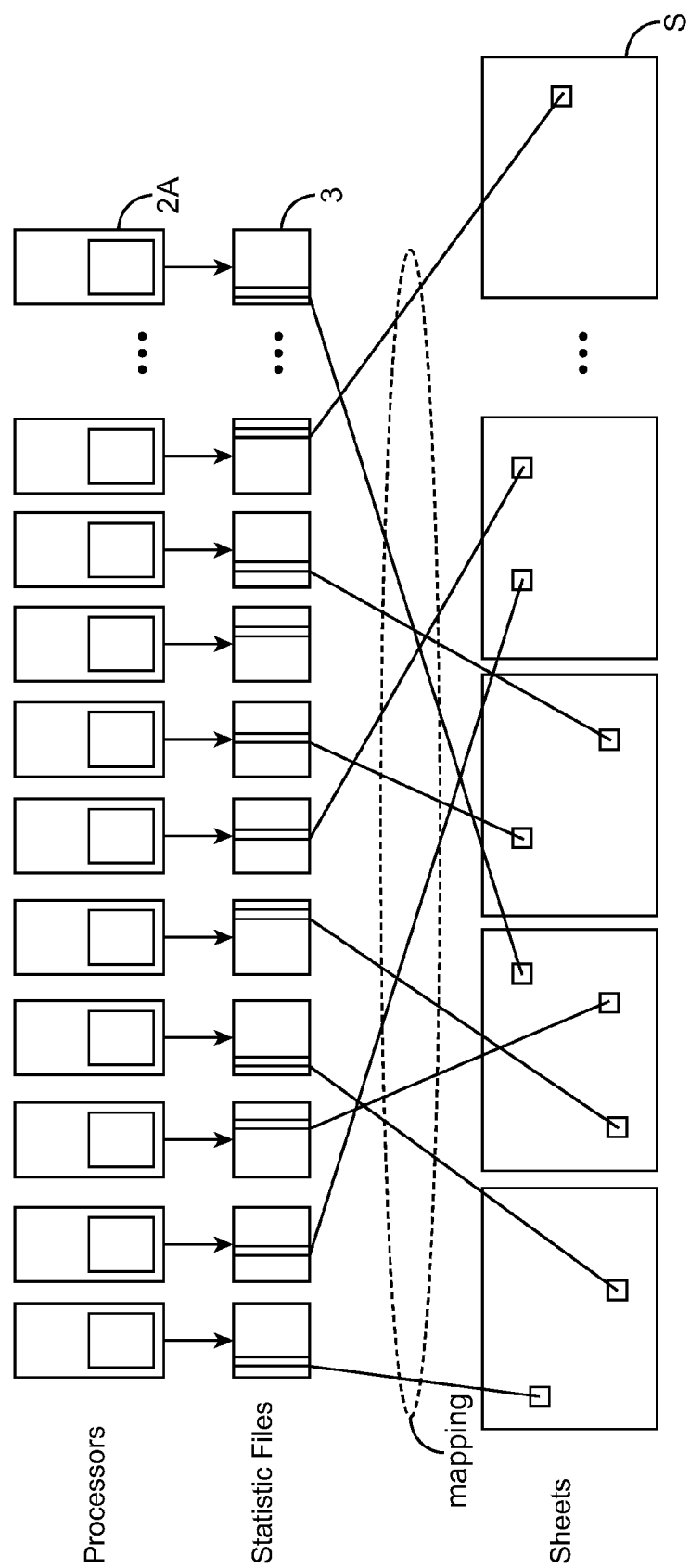
FIG. 5 shows an example mapping of spatiotemporal data to pixels for display on display monitor.

FIG. 5 shows a view of the steps in mapping data value to pixels in the video stream. Multiple processors 2A running a simulation generate statistics files 3 including data values and headers described above. Specifically, the processors 2A generate the streams of time series data in memory, and statistics files 3 are created to hold large datasets on disk in a distributed fashion, one for each processor. Then sheets S are synthesized from the statistic files 3 using the reverse index. The sheets S illustrated in this example only show one frame of a video stream. The shown selected column in each statistics file corresponds to a particular (i,j) position on the sheet, with timestamp increasing down the column.

The characteristics (e.g., color) of the pixel in each frame at grid position (i,j) of each sheet S encodes the data sample value at that time instance. The data sample value could be an integer or a floating point number, e.g., the synaptic current is specified in floating point format. The color mapping is performed by uniformly quantizing the HSV color space (Hue Saturation, brightness Value), as shown by example in FIG. 4. In this example, the maximum value of data sample is represented by color white, minimum value by color black and intermediate values by dividing the space uniformly. FIG. 4 shows a color file having 64 colors, with only seven colors used by video sheets for seven possible values for the firing rate in this example. In the case of floating point numbers, the range of values is quantized to discrete colors using the distribution of the values.

Time-Series Plots

A tstats file provides (FIG. 6) aggregate global statistics (e.g., total inhibitory firing count) of the simulation for each timestep. In a preferred embodiment this data is rendered using the time series plots in the visualizer 5. Essentially, a first header in tstats file indicates the number of timesteps being recorded (which can be less than the total number of timesteps of the entire simulation), and the number of neurons represented by the total statistics, and the number of synapses. A next header in tstats file includes the headers of each function Z that applies an operation to either the entire neuron population, excitatory neuronal population, inhibitory neuronal population, current, and other variables found in the simulation. Following the two header rows, there are n rows that correspond to the Ntimesteps as specified in the header. Each integer or floating point number is separated by a "|" character in order to allow for easy tokenization. Overall, tstats provides a series of tagged data that are useful for viewing a time-series plot synchronously with the video streams. FIG. 6 provides an example of an abbreviated tstats file.

Encoding

Figure 7A:
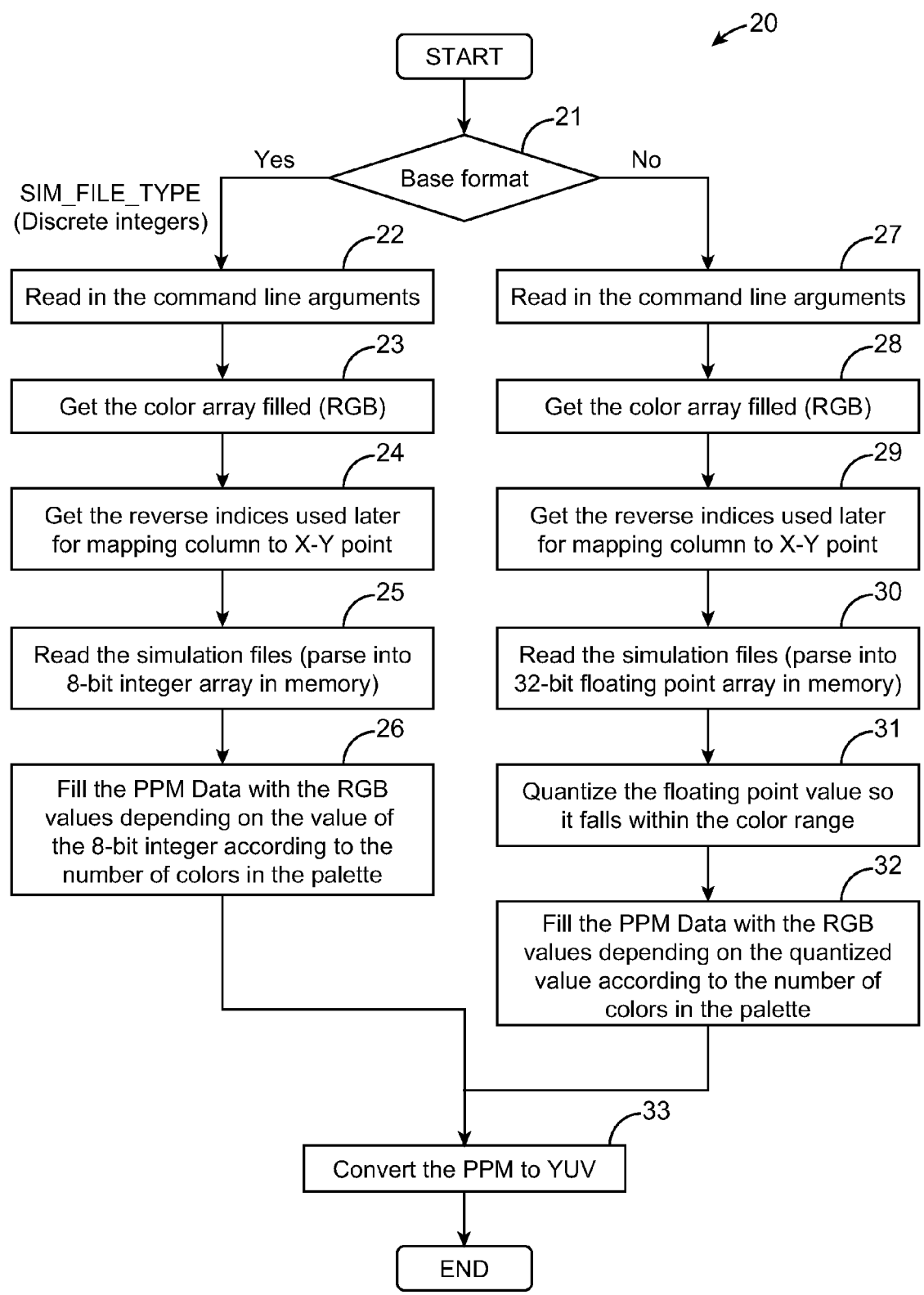
FIG. 7A shows a flowchart of an example process for reading from multiple statistic files for video encoding.
Figure 7B:
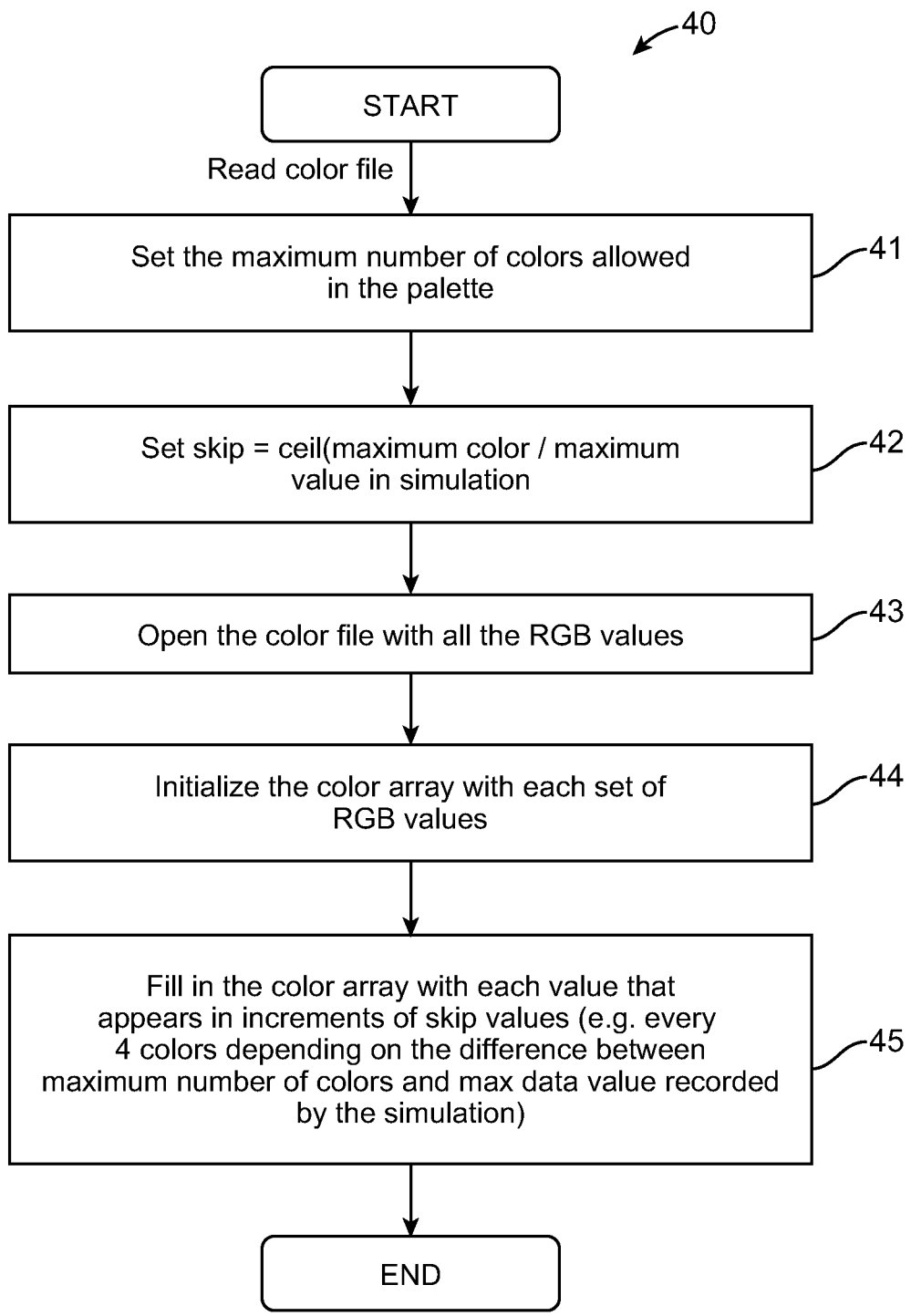
FIG. 7B shows a flowchart of an example process for generating a color array that fills in the pixels in video sheets.
Figure 7C:
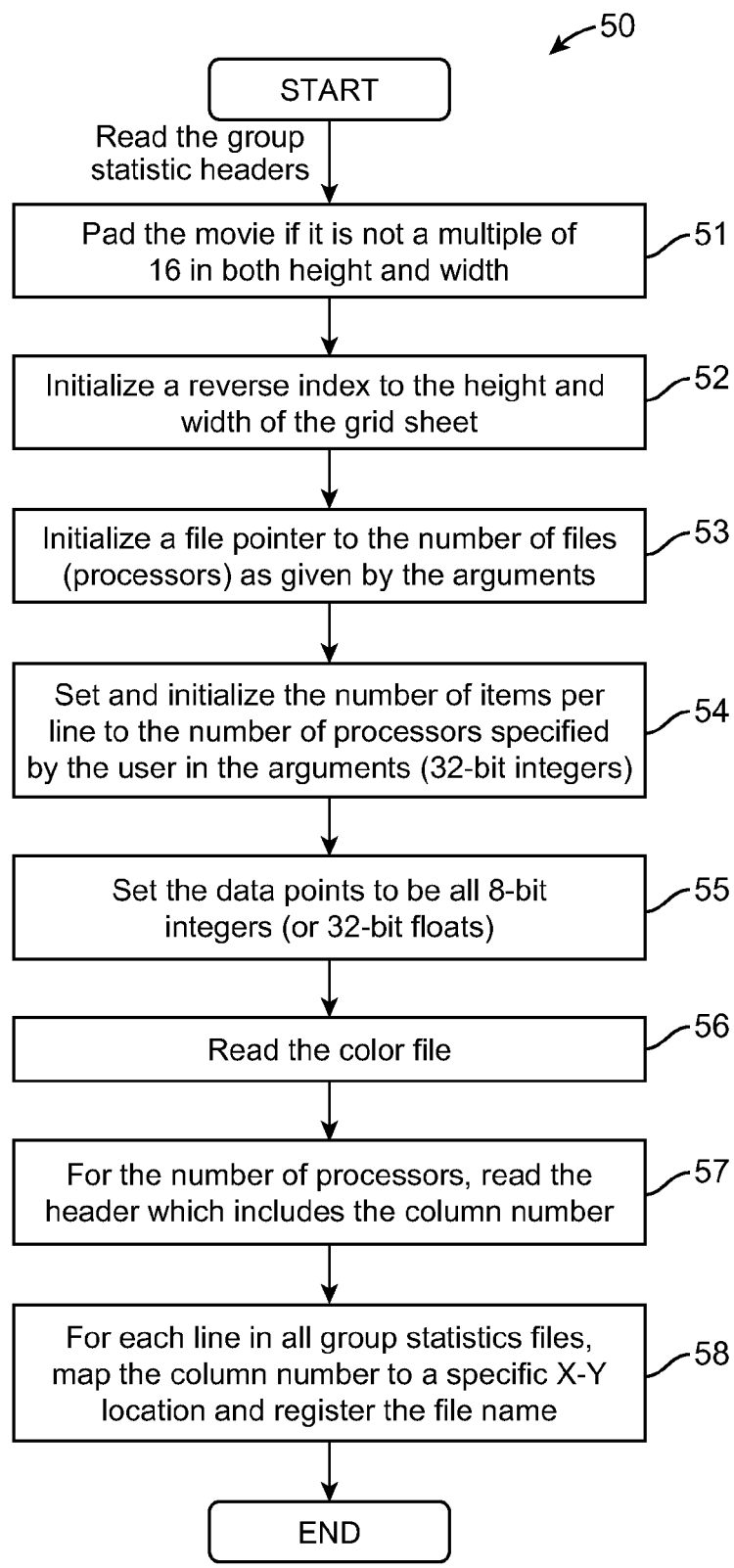
FIG. 7C shows a flowchart of an example process for mapping a column number in each file to a corresponding grid position of a video sheet.

In one embodiment of the present invention, the encoder 4 (FIG. 1) provides video encoding comprising conversion of the data samples into video streams, described in more detail in relation to flowcharts in FIGS. 7A-C. FIG. 7A shows a flowchart for a Berkeley MPEG Encoding process 20, modified to read from multiple statistic files for video encoding. The left branch shows base format processing of discrete values (e.g., gstats or sstats values), the right branch shows the processing of continuous values (e.g., istats values). The process 20 includes the following processing blocks:

Block 21: Base format? If yes, proceed to block 22, else proceed to block 27.
Block 22: Read in the command line arguments.
Block 23: Get the color array filled (e.g., red, green, blue (RGB)).

Block 24: Get the reverse indices used later for mapping column to (i,j) grid position.

Block 25: Read the simulation files (parse into 8-bit integer array in memory).

Block 26: Fill the PPM Data with the RGB values depending on the value of the 8-bit integer according to the number of colors in the palette. Proceed to block 33.

Block 27: Read in the command line arguments.

Block 28: Get the color array filled (RGB).

Block 29: Get the reverse indices used later for mapping column to (i,j) grid position.

Block 30: Read the simulation files (parse into 32-bit floating point array in memory).

Block 31: Quantize the floating point value so it falls within the color range.

Block 32: Fill the PPM Data with the RGB values depending on the quantized value according to the number of colors in the palette. Proceed to block 33.

Block 33: Convert the PPM to YUV. End.

FIG. 7B shows a flowchart 40 for generating a color array that fills in the pixels in the video sheets, comprising the following process blocks:

Block 41: Read the color file and set the maximum number of colors allowed in the palette.

Block 42: Set skip=ceil(maximum color/maximum value in simulation).

Block 43: Open the color file with all the RGB values.

Block 44: Initialize the color array with each set of RGB values.

Block 45: Fill in the color array with each value that appears in increments of skip values (e.g., every 4 colors depending on the difference between maximum number of colors and max data value recorded by the simulation).

FIG. 7C shows a flowchart 50 for mapping a column number in each file to a corresponding (i,j) grid position of ad sheet, including the following processing blocks:

Block 51: Pad the video if it is not a multiple of 16 in both height and width.

Block 52: Initialize a reverse index to the height and width of the grid sheet.

Block 53: Initialize a file pointer to the number of files (processors) as given by the arguments.

Block 54: Set and initialize the number of items per line to the number of processors specified by the user in the arguments (32-bit integers).

Block 55: Set the data points to be all 8-bit integers (or 32-bit floats).

Block 56: Read the color file (as shown in FIG. 7B).

Block 57: For the number of processors, read the header which includes the column number.

Block 58: For each line in all group statistics files, map the column number to a specific (i,j) grid position and register the file name using the operations described above.

User Interface

Figure 8:
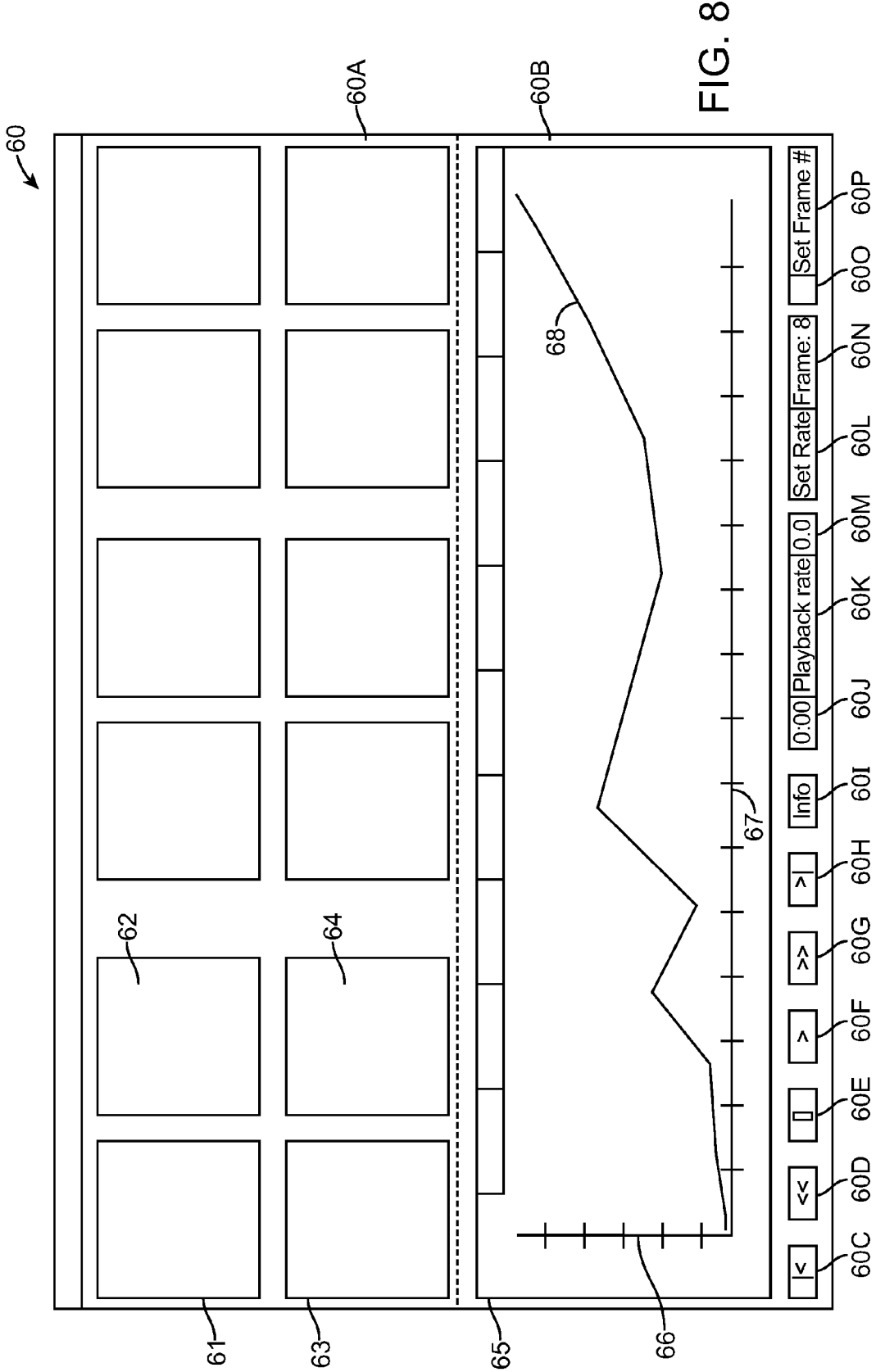
FIG. 8 shows an example visualizer output screen in a graphical user interface (GUI) for presentation of spatiotemporal data on a display monitor.

FIG. 8 shows an embodiment of the visualizer 5 (FIG. 1A) as GUI 60. (FIG. 2 shows an example of GUI 60 with specific values, as described above). As shown in FIG. 8, the GUI 60 provides video playback section 60A on top and a time-series plot playback 60B at the bottom.

The four frames (61, 62, 63, and 64) represent different hemispheres (left or right) and types of neurons (excitatory and inhibitory). The tabs 65 take information from the tstats files (described above) and extract each column of function Z where Z is a set of functions that can be applied to the entire array of neurons for any given simulation for every timestep. For example, the tab name may be total inhibitory firing, representing the total number of inhibitory neurons that are fired in the epoch of one millisecond. While running the visualizer, the user can easily switch from one function to another (only the data source to the chart updated is replaced via callback method). In this example, there are eleven possible functions. There may typically be around 50 functions with different maximums, minimums, distributions, etc. In playback 60B where the Y axis 66 is specified by the maximum and minimum of the time series being plotted at this time, and the X axis 67 changes depending on the play rate of the videos above to synchronize with the 2-D videos above. The plot 68 represents the value of a particular function Z at the previous X timesteps, wherein the number of previous timesteps can be specified by the user.

In order to provide familiar interfaces to the user, the control buttons in 60C-60H provide the same function as found on a DVD player where button 60C skips to the beginning of the video, button 60D decreases the rate of playback at increments of 0.5, button 60E stops the playback of both the chart and the 2-D videos, button 60F plays the chart and video at the normal speed of 1.0, button 60G increases the rate of playback at increments of 0.5, and button 60H moves the video to the end of its length.

Window 60I provides user with the information about the simulation as to allow for contents of the csim.* file to be displayed in a readable format in a message box. csim.in is the input file that specifies the parameters of the simulation, while in csim*.out file, all the statistics of the resulting cortical network are articulated in precise fashion. This includes memory utilization and computation time which are then shown to user in Window 60I. Window 60J shows the current time in increments of seconds. 60K shows playback rate. The set rate button 60L is pressed whenever the user wishes to manually change the rate to his or her liking by first specifying it in 60M and then pressing the button. Window 60N shows the current frame being displayed (e.g., 33 frames/sec) and updates according to a predefined timer. The user may set a desired frame number to view by specifying the frame number in window 60O and then pressing the button in 60P. The user may proceed frame-by-frame through the videos by first stopping the playback by hitting the spacebar button on the keyboard and then hitting either the left or right arrow key on the keyboard.

In one example, the dashboard is instantiated by running ajar file along with a number of parameters and flags. In this example, the name of the jar file is braincamVX.jar and the list of the parameters are the following: N 2-D mpeg encoded video files, the csim file (describing the parameter settings of the simulation), the tstats file (a file that applies Z functions, e.g., the average synaptic current across the entire network, on all the data for every timestep such as 1 millisecond in the case of C2), and finally a binary flag that enables and disables the display of the multi-graph display at the bottom of the dashboard. An example of the command for starting the GUI 60 is:

java-jar braincamVX.jar <file 1> . . . <file N> csim.out tstats chart_flag.

In a preferred embodiment, this command creates an Abstract Windowing Toolkit (AWT) frame in Java Swing application software with a number of widgets to guide the display of the videos, chart, and their control. The GUI 60 supports an infinite number of videos and tabbed streaming graphs depending on the amount of memory and screen size on the computer where the software is running As noted, the user may choose the number of video sequences to be displayed and the placement of the videos in the dashboard. Similarly, multiple time series plots may be played back at the bottom. Using tabs the user can navigate between these plots. The plot playback and video playback are synchronized using the methodology of master-slave with "sync pulses" such as described in U.S. Pat. No. 5,784,067 to Koval et al. The speed of playback can be varied from fractions of 30 frames per second (fps) to integral multiples of 30 fps. For example, 15 fps and 60 fps are valid playback rates. Rewinding the video sequence or positioning the start of video for playback will similarly update the status of the time-series plots.

Figures 1, 9A:
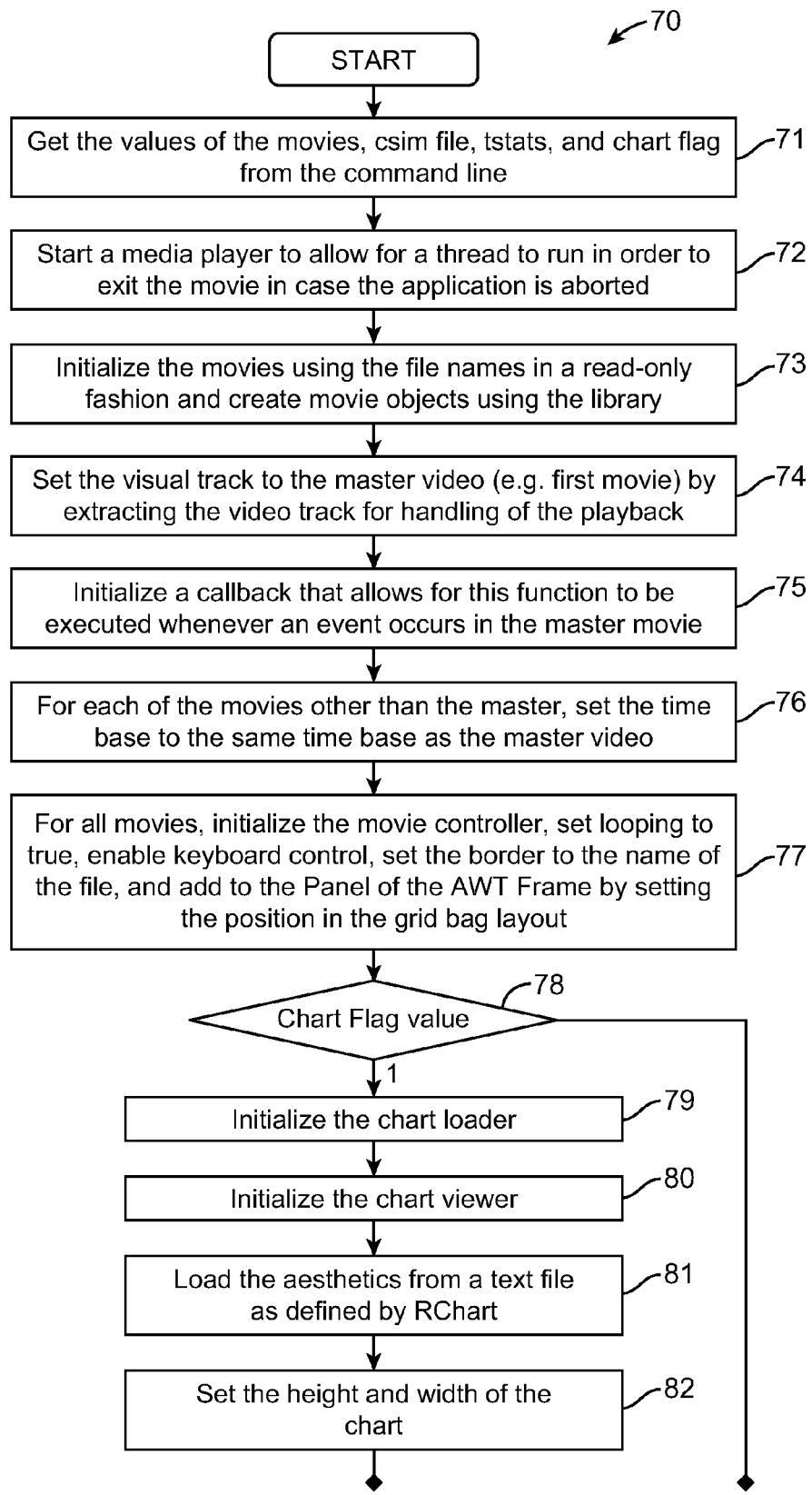
FIG. 9A shows a flowchart of an example graphical user interface (GUI) operation for spatiotemporal simulation data driven visualization.
Figures 2, 9A:
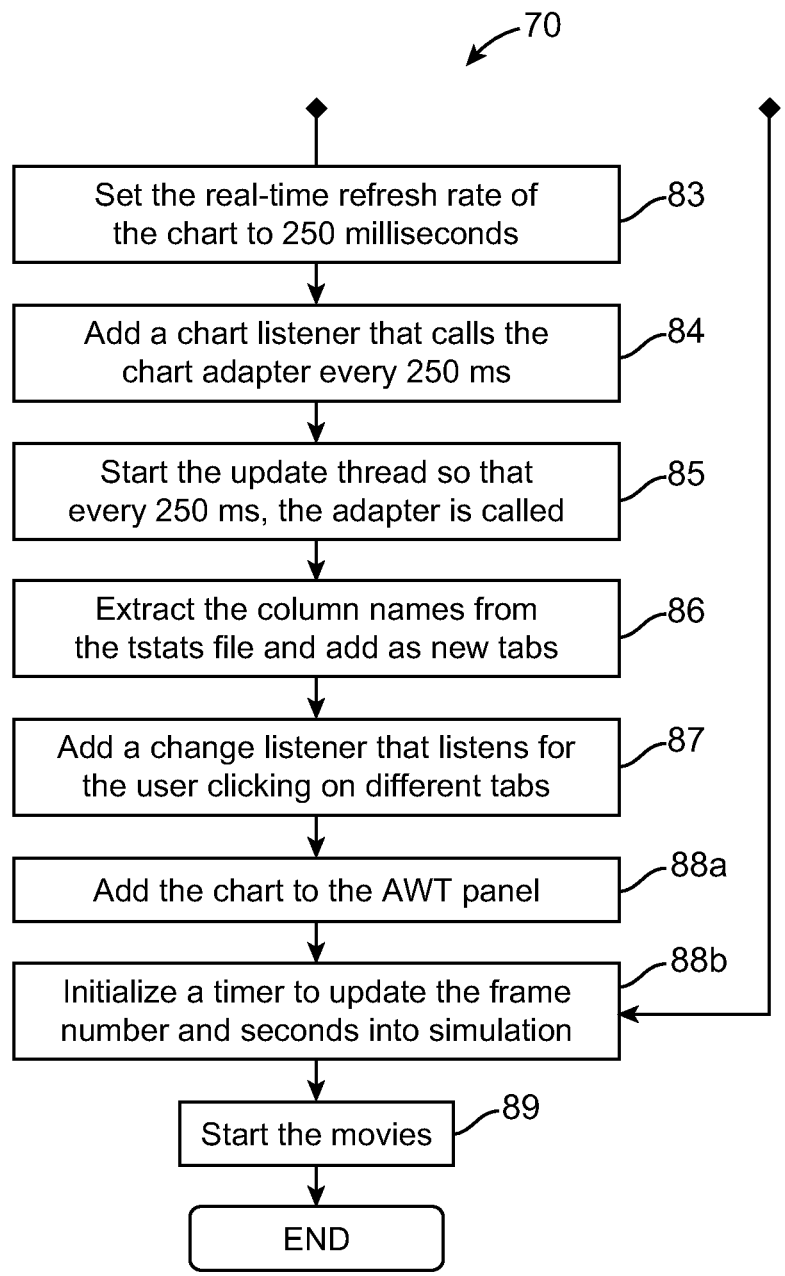
Figure 9B:
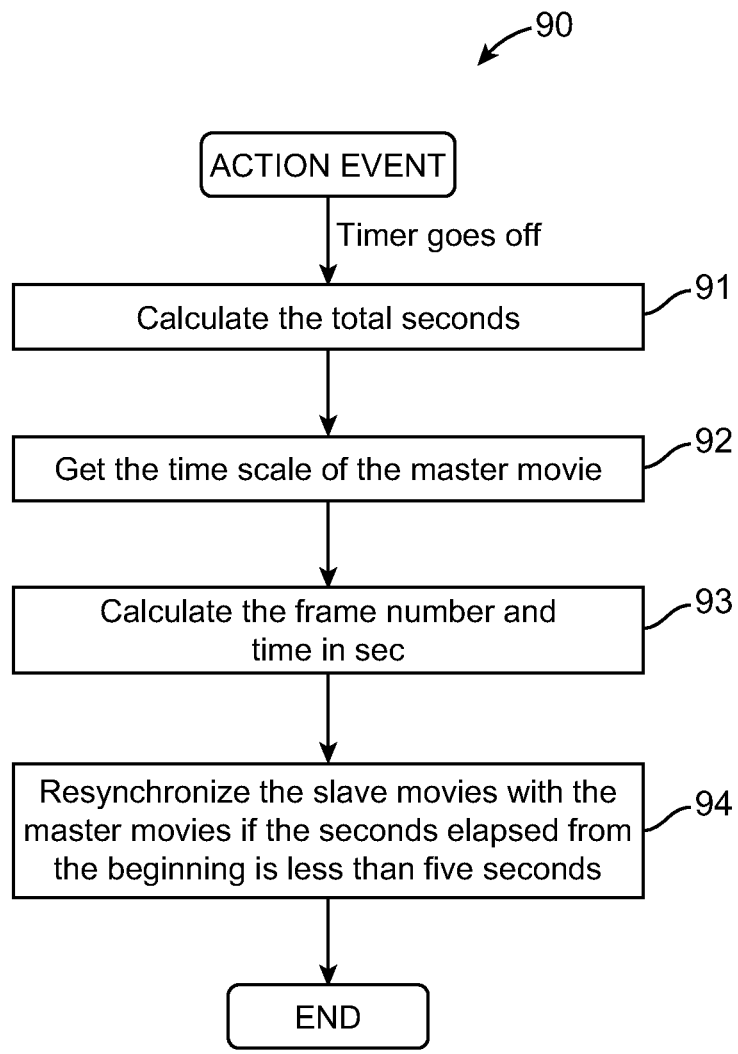
FIG. 9B shows a flowchart of an example process for displaying videos and time-series plots.
Figure 9C:
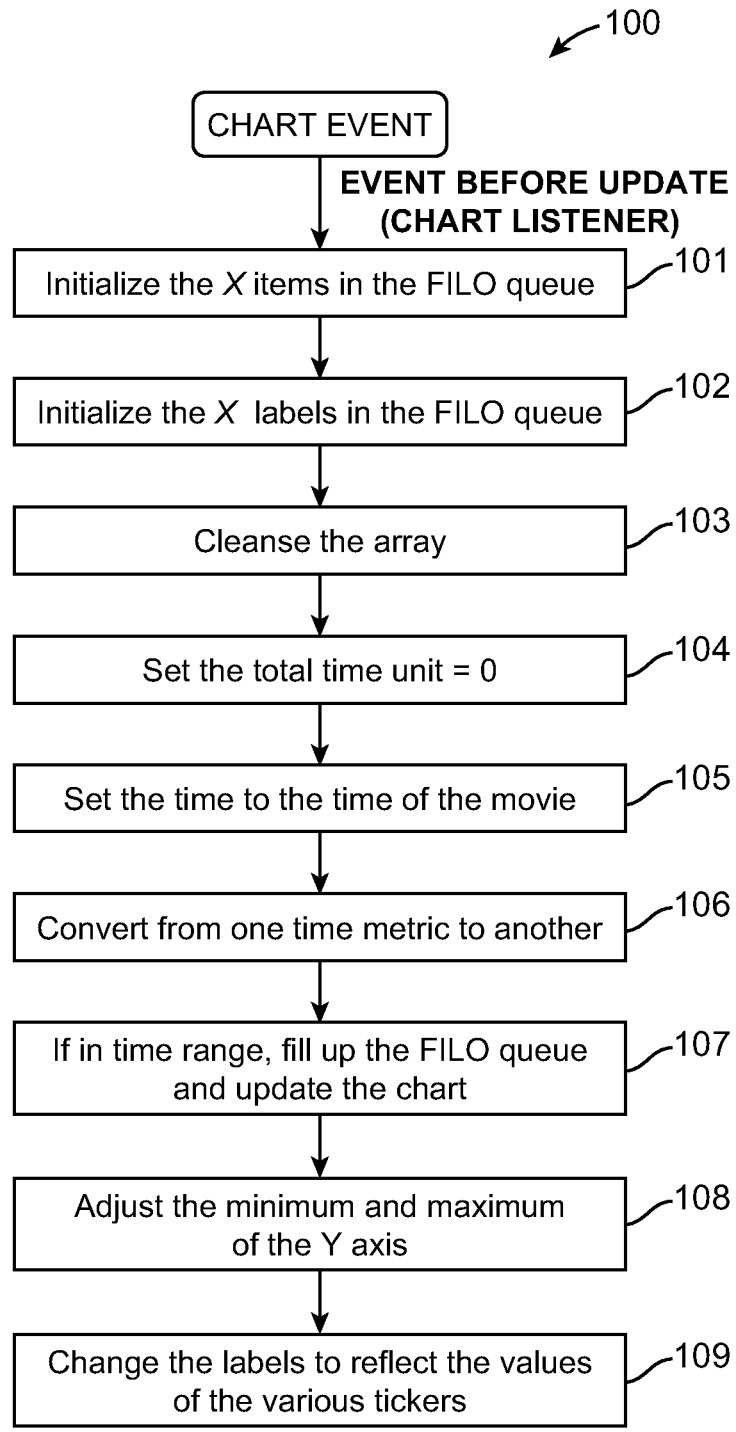
FIG. 9C shows a flowchart of an example process for time-series playback.

FIGS. 9A-C show example flowcharts for generating and operating the GUI 60. FIG. 9A shows a flowchart of an embodiment of the overall operation of the GUI 60. As the videos and time-series plots are displayed, the frame number and simulation time are updated according to the embodiment shown by the flowchart in FIG. 9B. The flowchart in FIG. 9C is for an embodiment of a time-series playback.

Specifically, FIG. 9A shows a flowchart of a process 70 for setting up the videos, charts, and initializing the different timers and threads that run in the background in order to provide the real-time playback controls found in typical media player such as a DVD player. The process includes the following processing blocks:

Block 71: Get the values of the videos, csim file, tstats, and chart flag from the command line.
Block 72: Start a media player session (e.g., Quicktime Session) to allow for a thread to run in order to exit the video in case the GUI application is aborted.
Block 73: Initialize the videos using file names in a read-only fashion and create video objects using a library.
Block 74: Set the visual track to the master video (e.g., first video) by extracting the video track for handling of the playback.
Block 75: Initialize a function callback that allows for the playback function to be executed whenever an event occurs in the master video.
Block 76: For each of the videos other than the master, set the time base to the same time base as the master video (e.g., first one).
Block 77: For all videos, initialize a video controller, set looping to true, enable keyboard control, set the border to the name of the file, and add to a Panel of the AWT Frame by setting the position in the grid layout.
Block 78: Chart Flag value? If yes, proceed to block 79, else proceed to block 88*b*.
Block 79: Initialize a chart loader.
Block 80: Initialize a chart viewer.
Block 81: Load aesthetics from a text file as defined by RChart.
Block 82: Set the height and width of the chart.
Block 83: Set the real-time refresh rate of the chart to e.g., 250 milliseconds (ms).
Block 84: Add a chart listener function that calls a chart adapter function every 250 ms.
Block 85: Start the update thread so that every 250 ms, the adapter is called.
Block 86: Extract the column names from the tstats file and add as new tabs.
Block 87: Add a change listener function that listens for the user clicking on different tabs.
Block 88*a*: Add the chart to the Abstract Windowing Toolkit (AWT) panel.
Block 88*b*: Initialize a timer to update the frame number and seconds into simulation.
Block 89: Start the videos.

FIG. 9B shows a flowchart of a process 90 for maintaining the frame-number and time of the video videos. When the timer goes off every one second, it updates the frame number and the time information about the simulation being displayed. The process includes the following processing blocks:

Block 91: Upon an action event, calculate the total seconds.
Block 92: Get the time scale of the master video.
Block 93: Calculate the frame number and time in seconds.
Block 94: Resynchronize the slave videos with the master videos if the seconds elapsed from the beginning is less than five seconds.

FIG. 9C shows a flowchart of a process 100 for a time-series plot. Essentially, whenever a background thread goes off (every 250 ms), this process is invoked to allow for the values (which are independent of the presentation of the chart) to be updated regardless of the time step interval. The process includes the following processing blocks:

Block 101: Upon a chart event, initialize the Xitems in a first-in-last-out (FILO) queue.
Block 102: Initialize the X labels in the FILO queue.
Block 103: Cleanse the array.
Block 104: Set the total time unit=0.
Block 105: Set the time to the time of the video.
Block 106: Convert from one time metric to another.
Block 107: If in time range, fill up the FILO queue and update the chart.
Block 108: Adjust the minimum and maximum of the Y axis.
Block 109: Change the labels to reflect the values of the various time tickers.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 10:
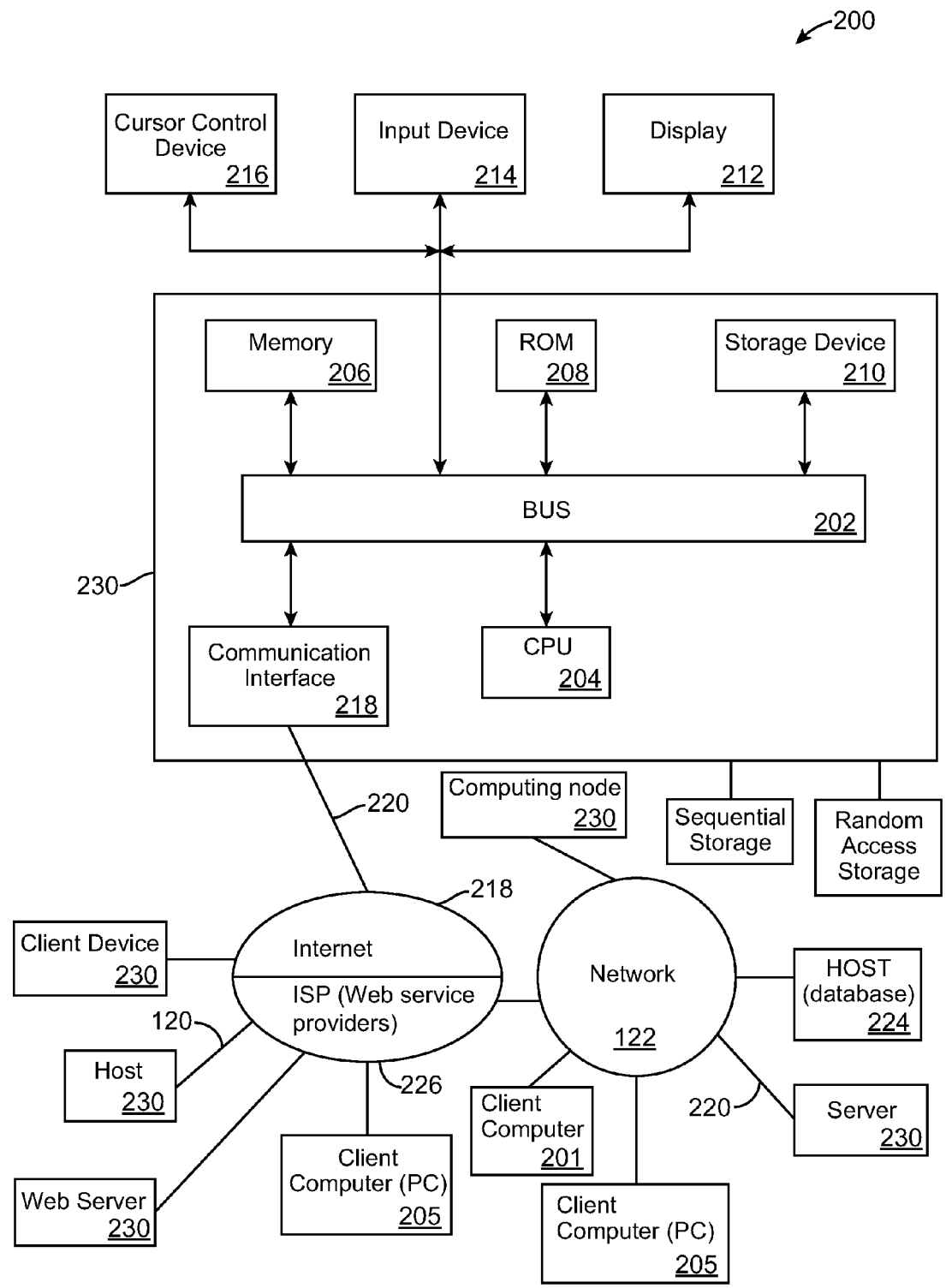
FIG. 10 shows a block diagram of an example system in which adaptive, integrated process, for visualization of spatiotemporal data from large-scale simulations may be implemented.

FIG. 10 shows a block diagram of example architecture of an embodiment of a system 200 for implementing an embodiment of the invention. The system 200 includes one or more client devices 201 connected to one or more server computing systems 230. A server 230 includes a bus 202 or other communication mechanisms for communicating information, and a processor (CPU) 204 coupled with the bus 202 for processing information. The server 230 also includes a main memory 206, such as a random access memory (RAM) or other dynamic storage device, coupled to the bus 202 for storing information and instructions to be executed by the processor 204. The main memory 206 also may be used for storing temporary variables or other intermediate information during execution or instructions to be executed by the processor 204.

The server computer system 230 further includes a read only memory (ROM) 208 or other static storage device coupled to the bus 202 for storing static information and instructions for the processor 204. A storage device 210, such as a magnetic disk or optical disk, is provided and coupled to the bus 202 for storing information and instructions. The bus 202 may contain, for example, thirty-two address lines for addressing video memory or main memory 206. The bus 202 can also include, for example, a 32-bit data bus for transferring data between and among the components, such as the CPU 204, the main memory 206, video memory and the storage 210. Alternatively, multiplex data/address lines may be used instead of separate data and address lines.

The server 230 may be coupled via the bus 202 to a display 212 for displaying information to a computer user. An input device 214, including alphanumeric and other keys, is coupled to the bus 202 for communicating information and command selections to the processor 204. Another type of user input device comprises cursor control 216, such as a mouse, a trackball, or cursor direction keys for communicating direction information and command selections to the processor 204 and for controlling cursor movement on the display 212.

According to one embodiment of the invention, the functions of the invention are performed by the server 230 in response to the processor 204 executing one or more sequences of one or more instructions contained in the main memory 206. Such instructions may be read into the main memory 206 from another computer-readable medium, such as the storage device 210. Execution of the sequences of instructions contained in the main memory 206 causes the processor 204 to perform the process steps described herein. One or more processors in a multi-processing arrangement may also be employed to execute the sequences of instructions contained in the main memory 206. In alternative embodiments, hard-wired circuitry may be used in place of or in combination with software instructions to implement the invention. Thus, embodiments of the invention are not limited to any specific combination of hardware circuitry and software.

Various forms of computer readable media may be involved in carrying one or more sequences of one or more instructions to the processor 204 for execution. For example, the instructions may initially be carried on a magnetic disk of a remote computer. The remote computer can load the instructions into its dynamic memory and send the instructions over a telephone line using a modem. A modem local to the server 230 can receive the data on the telephone line and use an infrared transmitter to convert the data to an infrared signal. An infrared detector coupled to the bus 202 can receive the data carried in the infrared signal and place the data on the bus 202. The bus 202 carries the data to the main memory 206, from which the processor 204 retrieves and executes the instructions. The instructions received from the main memory 206 may optionally be stored on the storage device 210 either before or after execution by the processor 204. The server 230 also includes a communication interface 218 coupled to the bus 202. The communication interface 218 provides a two-way data communication coupling to a network link 220 that is connected to the world wide packet data communication network now commonly referred to as the Internet 228. The Internet 228 uses electrical, electromagnetic or optical signals that carry digital data streams. The signals through the various networks and the signals on the network link 220 and through the communication interface 218, which carry the digital data to and from the server 230, are exemplary forms or carrier waves transporting the information.

In another embodiment of the server 230, interface 218 is connected to a network 222 via a communication link 220. For example, the communication interface 218 may be an integrated services digital network (ISDN) card or a modem to provide a data communication connection to a corresponding type of telephone line, which can comprise part of the network link 220. As another example, the communication interface 218 may be a local area network (LAN) card to provide a data communication connection to a compatible LAN. Wireless links may also be implemented. In any such implementation, the communication interface 218 sends and receives electrical electromagnetic or optical signals that carry digital data streams representing various types of information.

The network link 220 typically provides data communication through one or more networks to other data devices. For example, the network link 220 may provide a connection through the local network 222 to a host computer 224 or to data equipment operated by an Internet Service Provider (ISP) 226. The ISP 226 in turn provides data communication services through the Internet 228. The local network 222 and the Internet 228 both use electrical, electromagnetic or optical signals that carry digital data streams. The signals through the various networks and the signals on the network link 220 and through the communication interface 218, which carry the digital data to and from the server 230, are exemplary forms or carrier waves transporting the information.

The server 230 can send/receive messages and data, including e-mail, program code, through the network, the network link 220 and the communication interface 218. Further, the communication interface 218 can comprise of a USB/Tuner and the network link 220 may be an antenna or cable for connecting the server 230 to a cable provider, satellite provider or other terrestrial transmission system for receiving messages, data and program code from another source.

The example versions of the invention described herein may be implemented as logical operations in a distributed processing system such as the system 200 including the servers 230. The logical operations of the present invention can be implemented as a sequence of steps executing in the server 230, and, as interconnected machine modules, within the system 200. The implementation is a matter of choice and can depend on performance of the system 200 implementing the invention. As such, the logical operations constituting said example versions of the invention are referred to for e.g. as operations, steps or modules.

Similar to a server 230 described above, a client device 201 can include a processor, memory, storage device, display, input device and communication interface (e.g., e-mail interface) for connecting the client device to the Internet 228, the ISP 226, or LAN 222, for communication with the servers 230.

The system 200 can further include computers (e.g., personal computers, computing nodes) 205 operating the same manner as client devices 201, wherein a user can utilize one or more computers 205 to manage data in the server 230.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for presenting data from a simulation of a network of neurons, wherein the data is presented on a display screen, comprising:
    performing a simulation utilizing a simulator comprising multiple processors;
    generating spatiotemporal data samples comprising neuronal and synaptic information from the simulation of neurons, wherein each data sample has spatial coordinates with a time stamp at a specific time resolution, and wherein each data sample further comprises a tag identifying said data sample;
    assembling the data samples into data streams based on a least one of a spatial relationship and tags associated with the data samples;
    encoding each data stream into multiple formats by performing two-dimensional color-mapping visualization of the data samples based on spatial coordinates, time stamp and value of each data sample; and displaying an integrated and adaptive visualization of the data streams, wherein various data streams in multiple formats are simultaneously and synchronously displayed.

2. The method of claim 1, wherein for each data sample spatial relationships are defined over a k-dimensional grid.

3. The method of claim 2, wherein:
the neuronal and synaptic information comprises a neuronal state of at least one neuron;
wherein a neuronal state of a neuron comprises information relating to at least one of the following: a spiking of said neuron, a membrane potential of said neuron, and a synaptic current associated with said neuron.

4. The method of claim 1, further comprising: changing the number of data streams being displayed at run-time, for enabling a user to tailor the visualization according to the simulation experiment.

5. The method of claim 1, wherein encoding each data stream further comprises: segregating the data samples into data streams corresponding to different cortical sheets on a display grid, and generating a video stream for each cortical sheet, wherein all data values at a time instance are mapped to a frame of the video stream, such that a pixel of the frame represents a grid position and color of the pixel encodes the data value at that time instance.

6. The method of claim 1, wherein: generating spatiotemporal data samples from the simulation further comprises storing the data samples from each processor in a storage; assembling the data samples into data streams further comprises reading said stored data samples from different processors and assembling the data samples into data streams based on a least one of: a spatial relationship and tags associated with data samples; and encoding each data stream further comprises displaying the data streams as a time-series plot representing the value of data samples at previous X timesteps, wherein the number of previous timesteps can be specified by the user.

7. A computer program product for presenting data from a simulation of a network of neurons, wherein the data is presented on a display screen, the computer program product comprising:
a computer usable non-transitory medium having computer readable program code embodied therewith, computer readable program code comprising:
computer readable program code configured to perform a simulation utilizing a simulator comprising multiple processors;
computer readable program code configured to generate spatiotemporal data samples comprising neuronal and synaptic information from the simulation of neurons, wherein each data sample has spatial coordinates with a time stamp and a specific time resolution, and wherein each data sample further comprises a tag identifying said data sample;
computer readable program code configured to assemble the data samples into data streams based on a least one of a spatial relationship and tags associated with the data samples;
computer readable program code configured to encode each data stream into multiple formats by performing two-dimensional color-mapping visualization of the data samples based on spatial coordinates, time stamp and value of each data sample; and
computer readable program code to display an integrated and adaptive visualization of the data streams, wherein various data streams in multiple formats are simultaneously and synchronously displayed.

8. The computer program product of claim 7, wherein for each data sample spatial relationships are defined over a k-dimensional grid.

9. The computer program product of claim 8, wherein:
the neuronal and synaptic information comprises a neuronal state of at least one neuron;
wherein a neuronal state of a neuron comprises information relating to at least one of the following: a spiking of said neuron, a membrane potential of said neuron, and a synaptic current associated with said neuron.

10. The computer program product of claim 7, further comprising computer readable program code configured to allow the number of data streams being displayed to be changed at run-time, thereby enabling a user to tailor the visualization according to the simulation experiment.

11. The computer program product of claim 10, further comprising:
computer readable program code configured to segregate the data samples into data streams corresponding to different cortical sheets on a display grid, and generate for display a video stream for each cortical sheet in a grid wherein all data values at a time instance are mapped to an frame of a video stream where a pixel of a frame represents a grid position and color of the pixel encodes the data value at that time instance;
computer readable program code configured to display the data streams as a time-series plot representing the value of data samples at previous X timesteps, wherein the number of previous timesteps can be specified by the user; and
computer readable program code configured to provide synchronous playback between various data streams.

12. A system for presenting data from a simulation of a network of neurons, wherein the data is presented on a display screen, comprising:
a simulator comprising multiple processors configured for performing a simulation and generating spatiotemporal data samples comprising neuronal and synaptic information from the simulation of neurons and storing the data samples from each processor in storage, wherein each data sample has spatial coordinates with a time stamp and a specific time resolution, and wherein each data sample further comprises a tag identifying said data sample;
an encoder configured for:
reading the stored data samples from different processors;
assembling the data samples into data streams based on at least one of a spatial relationship and tags associated with the data samples; and
encoding each data stream into multiple formats by performing two-dimensional color-mapping visualization of the data samples based on spatial coordinates, time stamp and value of each data sample; and
a visualizer configured for displaying an integrated and adaptive visualization of the data streams, wherein various data streams in multiple formats are simultaneously and synchronously displayed.

13. The system of claim 12, wherein:
the neuronal and synaptic information comprises a neuronal state of at least one neuron;
wherein a neuronal state of a neuron comprises information relating to at least one of the following: a spiking of said neuron, a membrane potential of said neuron, and a synaptic current associated with said neuron; and
spatial relationships are defined over a k-dimensional grid.

14. The system of claim 12, wherein the visualizer is further configured such that number of data streams being displayed can be changed at run-time, thereby enabling a user to tailor the visualization according to the simulation experiment.

15. The system of claim 14, wherein:
the visualizer is further configured for:
- segregating the data samples into data streams corresponding to different cortical sheets on a display grid, and generating a video stream for each cortical sheet in a grid wherein all data values at a time instance are mapped to an frame of a video stream where a pixel of a frame represents a grid position and color of the pixel encodes the data value at that time instance; and
- displaying the data streams as a time-series plot representing the value of data samples at previous X timesteps, wherein the number of previous timesteps can be specified by the user; and providing synchronous playback between various data streams.

16. The system of claim 15, wherein the simulator comprises a cortical simulator.

\* \* \* \* \*